United States Patent Office 3,179,719
Patented Apr. 20, 1965

3,179,719
RESIN COMPOSITION
Martin R. Cines, Bartlesville, Okla., assignor to Phillips Petroleum Company, a corporation of Delaware
No Drawing. Filed Jan. 15, 1962, Ser. No. 166,419
3 Claims. (Cl. 260—897)

This invention relates to an improved resinous composition of matter. In one aspect, it relates to an improved composition suitable for the blow-molding of bottles and the like. In another aspect, it relates to an improved composition suitable for the manufacture of filament and of plastic pipe, especially by extrusion.

The blow-molding of bottles from thermoplastic materials such as polymers of olefinic hydrocarbons is an established art. The use of such bottles as containers for liquids for household use, e.g. medicines and detergents, is advantageous, as compared with glass bottles, because plastic bottles are relatively light, easily disposable, and resistant to breakage. Corresponding advantages are realized in the use of thermoplastic pipe, as compared with metal pipe. Normally solid polymers of olefins, e.g. ethylene, are suitable materials for fabricating pipe and bottles.

In general, a thermoplastic material for use in forming pipe or bottles must have at least the following characteristics:

It must be sufficiently fluid in the molten state to be readily processable, i.e. extrudable and/or moldable, in equipment conventionally used for this purpose.

It must resist environmental stress cracking, in the presence of certain materials, such as detergents, for sufficient lengths of time to permit it to be used in the form of containers of such materials.

It must resist breakage by impact such as that produced when a bottle containing liquid detergent or the like is accidentally dropped to the floor.

The properties enumerated are correlatable with the molecular weight or the molecular weight distribution of the ethylene polymer in question. A polymer having a low molecular weight tends to be readily processable or formable, but also tends to have low resistance to mechanical impact or shock and to environmental stress cracking, which is the tendency of the polymer to become embrittled and crack on extended contact with certain liquids, such as certain household detergents. Conversely, an ethylene polymer of high molecular weight tends to be resistant to impact and invironmental stress cracking, but tends to resist flow, even when molten, and is consequently difficult to mold. It is thus seen that the enumerated requirements tend to be mutually exclusive.

My invention solves the problem outlined hereinbefore by providing a thermoplastic composition which is readily formable into monofilaments, bottles, or pipe by the use of conventional equipment and technic.

An object of this invention is to provide an improved thermoplastic composition. Another object is to provide a composition readily formable into bottles by blow molding. Another object is to provide a composition suitable for the manufacture of extruded pipe or tubing. Another object is to improve the processability of certain types of ethylene copolymers. Another object is to improve the resistance of certain types of ethylene homopolymers and copolymers toward impact and environmental stress cracking. Another object is to provide an improved material for use in the form of monofilament. Other objects and advantages will be apparent to those skilled in the art on reading this specification.

According to this invention, I provide an ethylene copolymer blend having a melt index in the range 0.07 to 0.50 and a density in the range 0.935 to 0.950. In one embodiment, said copolymer is a copolymer of ethylene and 1-butene, and said blend has a degree of chain branching in the range 2.0 to 8.0 ethyl groups per thousand carbon atoms.

My copolymer blend is a homogeneous mixture of two ethylene polymers which, for the sake of convenience, can be referred to as Component A and Component B.

Component A is ordinarily a copolymer of ethylene with 1-butene but can generally be a copolymer of ethylene with an aliphatic monoolefin having from 3 to 8 carbon atoms per molecule. It has a density from 0.930 to 0.943 gram per cc. and a high-load melt index in the range 0.5 to 2.7, frequently 1 to 2.

Component B can be a copolymer of ethylene with a monoolefinic comonomer as described in connection with Component A. Component B has a density in the range 0.940 to 0.960 often being preferred, and a melt index in the range 0.5 to 20.0.

For pipe, Component A amounts to from 25 to 60 weight percent of the blend. For bottles, Component A amounts to from 25 to 45 weight percent of the blend.

Blending can be accomplished by any of the polymer blending methods known in the art. For example, the two polymeric components can be intermixed as comminuted solids and blended in an intensive mixer which melts and mixes the polymers. Alternatively the two polymers can be dissolved in a suitable solvent, e.g. methylcyclohexane, 2,2,4-trimethylpentane, any of the dodecanes, cyclohexane, toluene or any of the xylenes, and recovered from solution, by cooling and precipitating, for example, and/or by vaporizing the solvent.

The individual components of the blends according to this invention can be prepared by any of the methods known in the art.

A suitable catalyst for synthesizing Components A and B is a chromium oxide catalyst of the type described in Hogan and Banks U.S. Patents 2,825,721 (1958) and 2,951,816 (1960), particularly a chromium oxide-silica-alumina catalyst as described in said patents.

Component A can be synthesized by copolymerizing ethylene with 1-butene, or propylene, for example, in the presence of a suspension of the chromium oxide catalyst in a liquid, inert diluent such as propane, n-pentane, n-hexane, cyclohexane, isopentane, or isobutane at 100° to 225° F. so that the copolymer forms a solid, particulate, mobile, nonagglutinative suspension in the reaction mixture. The olefin comonomer is usually propylene or 1-butene because these are usually most readily available. However other olefins having from 3 to 8 carbon atoms per molecule can be used as the comonomer; examples are 2-butene, 1-pentene, 1-hexene, 4-methyl-1-pentene, 1-heptene, 1-octene, and 4-ethyl-1-hexene.

Component B can be synthesized in the same manner as Component A and the polymerization temperature is in the range 240° to 310° F. so that the polymer forms as a solution thereof in the diluent.

In each component, the comonomer accounts for only a small percentage (e.g. up to about 5 mol percent) of the total monomer units in the polymer.

*Examples 1, 2 and 3*

Blends in accordance with this invention were prepared by mixing solutions of Components A and B in cyclohexane. The mixed solution was then mixed with water to cool and precipitate the polymer. The cyclohexane was vaporized by contacting with steam, and the granular polymer was skimmed from the water phase and dried. Both Components A and B were prepared by the copolymerization of ethylene with 1-butene in the presence of a chromium oxide-silica-alumina catalyst as described in the Hogan and Banks patents cited hereinbefore. Component A was formed by copolymerization of ethylene with 1-butene in suspension in n-pentane at a temperature of 180° to 200° F. Component B was formed by polymerization in solution in cyclohexane at 250° to 300° F. Bottles having a capacity of 10 ounces and a wall thickness of 22 to 30 mils were formed from the blended copolymers and tested in accordance with the environmental stress cracking (ESC) and drop tests subsequently cited herein. Properties of Components A and B, properties of the blends, and results of the ESC and drop tests are shown in the following tabulation:

| Example | 1 | 2 | 3 |
|---|---|---|---|
| Wt. percent in Blend: | | | |
| A | 40 | 37 | 26 |
| B | 60 | 63 | 74 |
| Density, gm./cc.: | | | |
| A | 0.939 | 0.939 | 0.940 |
| B | 0.950 | 0.950 | 0.950 |
| Blend | 0.948 | 0.948 | 0.948 |
| Melt Index: | | | |
| A (high load) | 0.9 | 0.5 | 2.7 |
| B | 4.0 | 6.5 | 1.2 |
| Blend | 0.20 | 0.22 | 0.37 |
| Ethyl Branches [1] per 1,000 C atoms, Blend | 6.2 | 3.8 | 4.2 |
| Bottle Tests: | | | |
| $F_{50}$ (ESC), hr | >330 | 875 | >1,000 |
| Drop Test, ft | >12 | >12 | >12 |

[1] Uncorrected for terminal groups on main C chain.

The foregoing data show the excellent suitability of the blends in accordance with this invention for fabrication of bottles and illustrate the suitability of such bottles as containers for detergents.

The blend of Example 1 was formed into monofilament utilizing a 1.25-inch Hartig extruder equipped with an eight-hole die (42-mil orifice). The filament upon leaving the die entered a water bath maintained at 80° F. It was then wound around a first set of Godet rolls, passed through an annealing cabinet maintained at 210° F., passed around a second set of Godet rolls and finally wound up on a takeup spool. The extrusion conditions were as follows: stock temperature, 510 to 530° F.; screw speed, 21.5 r.p.m.; screen pack 60/150/60/20. The total draw ratio was 10.5:1. The resulting 7.03-denier monofilament, under a tension load of 25,000 p.s.i., at 25° to 30° C., had not failed after 4,000 hours. As a comparison, an ethylene-1-butene copolymer having a density of 0.950 and a melt index of 0.3 failed under this load and conditions in 200 to 300 hours. Component A could not be formed into monofilament under the conditions described.

Example IV

An additional blend of equal weights of Components A and B was prepared in accordance with this invention. Both components were copolymers of ethylene and 1-butene prepared as described in Examples 1-3. Component A had a density of 0.932 and a high load melt index of 1.6. Component B had a density of 0.950 and a melt index of 6.5. The resulting blend had a density of 0.943 and a melt index of 0.09. The blend was formed into ¾ inch O.D. tubing of 80-mil wall thickness by extrusion in a 2.5 inch National Rubber Machinery Co. extruder having a length-to-diameter ratio of 20:1. A water-cooled aluminum sizing tube 3 inches long was attached to the pipe die to assist in sizing and cooling. From the sizing tube, the extruded pipe entered a 10-foot long water bath and finally was passed through a pipe puller. The stock temperature was approximately 400° F., and the screw speed was approximately 60 r.p.m. A screen pack of size 20/80/20 was used. The head pressure was approximately 2500 p.s.i. An air pressure inside the pipe of about 20 p.s.i. was utilized, and a tubing rate of 25 to 30 feet per minute was obtained. The pipe thus formed showed long-term load-bearing capacity and long-term resistance to bursting superior to similar pipe produced from an ethylene-1-butene copolymer having a density of 0.950 and a melt index of 0.3 and is capable of being extruded to form pipe having a smooth surface at much higher rates than is said copolymer alone. Component A is not readily extrudable to form pipe by the use of the equipment and method described.

Various additives such as antioxidants, pigments, and the like can be added to the blends described herein without departing from the scope of this invention.

The properties which characterize the materials described in the specification and the claims hereof are determined as follows:

Melt index is determined by ASTM Method D-1238-57T. Condition E set forth in Table I of this ASTM method is used for determining the melt index of the blends and of Component B. Condition F in said Table I is used for determining the melt index of Component A. The melt index measured under condition F is referred to herein as "high-load melt index."

Environmental stress cracking resistance rating and bottle impact strength rating are determined as described in an article titled "How to Speed Up Plastic Bottle Testing," by R. J. Martinovich and Robert Doyle, Package Engineering, April 1961, pages 66 to 74. The bottles used for performing the tests were blow-molded by the use of an injection-molding machine described by D. L. Peters and J. N. Scott, Society of Plastic Engineers Journal 16, 73 (1960). The molding occurred at a minimum stock temperature of approximately 350° F. and a minimum cycle time of 17 seconds. The weight of each bottle was regulated to be 23.0±0.5 grams. The pinch-off width of the bottles was controlled at 1.375±0.125 inches.

The density referred to herein, is determined by ASTM Method D-1505-57T, with the exception that the sample is preconditioned as follows: The samples are prepared by compression-molding pellets of the ethylene polymer to form a slab about 6 inches square and ½₂ to ½ inch thick. A Pasadena press (Model P-325, Pasadena Hydraulics, Inc.) is used. The slabs are molded at 20,000 p.s.i. and 330° F. The heat is then turned off. Tap water is circulated through the mold cooling system. The slab is cooled to 200° F. at the rate of 25° F. per minute, and then to 150° as rapidly as possible by increasing the flow rate of the cooling water. The slab is then removed from the mold and allowed to stand for 24 hours at room temperature. Small pieces of the slab, e.g. about ¼ inch cubes, are cut off for the density determination. These pieces are examined to be sure that they have no surface pits or other features which might occlude or entrap air when immersed in liquid. The density is then determined as prescribed in the ASTM method. Ethanol and water are used as the suspending liquids.

*Degree of branching.*—The degree of branching is determined by means of an infrared spectrophotometer which measures absorption at 7.25 microns. In obtaining the data reported herein, the spectrophotometer was a Perkin-Elmer Model 21, Serial No. 713. Auxiliary equipment included a Buehler 10,000-pound press, a 1¼ inch diameter mold provided with a heater, aluminum foil discs, brass spacers and a thermometer having a range of 0 to 200° C. Also included were cardboard sample mounts and a variable-position sample-mount holder. A compensation wedge of polymethylene whose thickness varies from 175 to 355 microns is used to remove interference due to the methylene chain. While solid polymethylenes in general can be used for this purpose one having a number average molecular weight of at least 75,000 is preferred since the effect of terminal methyl groups in such a molecule is negligible. As standards for measurement of ethyl branching, copolymers containing 7.96, 18.36 and 28.98 equivalent ethyl branches were used to obtain the data reported herein. These values were based upon measurements in the liquid state at 150° C. utilizing 19,28-diethyl hexatracontane as a primary standard. In carrying out the branching determination, a circular film having a thickness of 300 to 400 microns is used. When the copolymer has a density of 0.950 or greater, a thickness in the range 350 to 400 microns is used. When the density is lower than 0.95, a thinner film is used. In preparing the sample, about 50 milligrams of polymer for each 100 microns thickness is weighed out. The weighed sample is placed in the mold assembly between aluminum foil discs, and a brass spacer of appropriate thickness is utilized. The assembly is gently pressed together to remove air. The mold assembly is inverted, the heater placed around it, the thermometer inserted into the well provided and heating is begun. When the temperature has reached 165° C. the heater and the thermometer are removed and the mold assembly is transferred to the press. A pressure of about 8000 pounds per square inch is applied. A jet of air is then directed against the mold to promote cooling. When the mold has cooled to room temperature, the molded film is removed and stapled to a cardboard sample mount. The thickness of the film is determined by measuring with a micrometer at several points along the opening in the sample mount and averaging the values obtained. A small piece of the film is cut away and used for a determination of density by the method previously referred to herein. The following conditions are selected for the particular instrument referred to herein: scale, 20 centimeters per micron; resolution 984; pen speed, 7; gain, 5; response, 1; different instruments require slightly different adjustments for optimum recording. The molded sample film is placed in the sample beam of the spectrophotometer and the polymethylene reference wedge is placed in the variable-position holder in the reference beam. After allowing a few minutes for the films to come to thermal equilibrium, the zero percent T line is set to coincide with the recording paper. The 7.25-micron band is then passed over several times and the position of the reference wedge adjusted until the points of maximum transmission on either side of the 7.25-micron band are the same within 0.5 percent. The spectrum between 7.0 and 7.5 microns is then recorded at a speed setting of 3–2 (about 7 minutes per micron). A base line is drawn tangent to the transmission maxima on either side of the 7.25-micron band, and the absorbance of this band is measured. The number of ethyl branches per thousand carbon atoms (N) is then calculated according to the following equation:

$$N = 0.8236 \left(\frac{A}{dt}\right)$$

where $A$ = baseline absorbance of 7.25 mircon band.
$d$ = density of sample film in g./ml.
$t$ = thickness of sample film in cm.

The calibration factor 0.8236 is different for other instruments and must be determined from the calibration copolymers. The value N calculated from the above equation assumes that all of the 7.25-micron absorption is due to ethyl branches, whereas in reality some of it arises from terminal methyl groups in the polymer. The true ethyl branching is given by $$N(\text{true}) = N(\text{measured}) - X$$

where X is a correction term for terminal methyls. If the number average molecular weight, $M_N$, and the number of vinyl groups per thousand carbon atoms, $N_V$, are known, X can be calculated as follows:

$$X = 0.65 \left(\frac{28,000}{M_N}\right) - N_V$$

where the factor 0.65 corrects for the fact that terminal methyl groups absorb only 65 percent as strongly as methyl groups on ethyl branches. Analysis of a series of copolymers with values of N up to 5 shows that duplicate results usually agree within 0.1 ethyl group. Values stated herein and in the claims for degree of branching are uncorrected for terminal methyl groups unless otherwise specified.

I claim:
1. A blend of two different ethylene polymers comprising
    (A) from 25 to 60 weight percent of a copolymer of ethylene and 1-butene having a density in the range 0.930 to 0.943 gm./cc. and a melt index (ASTM–D 1238–57T, Condition F) in the range 1.0 to 2.0; and
    (B) the remainder a copolymer of ethylene and 1-butene having a density in the range 0.940 to 0.960 gm./cc. and a melt index in the range 0.5 to 20 (ASTM–D 1238–57T, Condition E);
    said blend having a melt index in the range 0.07 to 0.50 (ASTM–D 1238–57T, Condition E), a density in the range 0.935 to 0.950 gm./cc. and a carbon-chain branching in the range 2.0 to 8.0 branches per thousand carbon atoms.
2. A blend of two different ethylene polymers comprising
    (A) from 25 to 60 weight percent of a copolymer of ethylene and 1-butene having a density in the range 0.930 to 0.943 gm./cc. and a melt index (ASTM–D 1238–57T, Condition F) in the range 0.5 to 2.7; and
    (B) the remainder, a copolymer of ethylene and 1-butene having a density in the range 0.940 to 0.960 gm./cc. and a melt index in the range 0.5 to 20 ASTM–D 1238–57T, Condition E);
    said blend having a melt index in the range 0.07 to 0.50 (ASTM–D 1238–57T, Condition E), a density in the range 0.935 to 0.950 gram per cc., and a carbon-chain branching in the range 2.0 to 8.0 branches per thousand carbon atoms.
3. A blend as described in claim 1 wherein said copolymer designated A constitutes 25 to 45 weight percent of said blend.

References Cited by the Examiner
FOREIGN PATENTS
1,240,852 8/60 France.
628,412 10/61 Canada.

LEON J. BERCOVITZ, *Primary Examiner.*
DONALD E. CZAJA, *Examiner.*